(12) United States Patent
Jensen et al.

(10) Patent No.: US 6,604,052 B1
(45) Date of Patent: Aug. 5, 2003

(54) METHODS FOR USE IN THREE-DIMENSIONAL STRUCTURAL DETERMINATION

(75) Inventors: Grant Jay Jensen, Concord, CA (US); Roger David Kornberg, Atherton, CA (US)

(73) Assignee: The Board of Trustee of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/579,721

(22) Filed: May 26, 2000

Related U.S. Application Data

(60) Provisional application No. 60/137,886, filed on Jun. 7, 1999.

(51) Int. Cl.[7] .......................... G06F 17/00; G01N 33/48; C12Q 1/68
(52) U.S. Cl. ................. 702/27; 702/19; 435/6
(58) Field of Search .......................... 702/27, 19; 435/6

(56) References Cited

PUBLICATIONS

Boisset et al. (1992). "Three–Dimensional Reconstruction of a Complex of Human $\alpha_2$–Macroglobulin with Monomaleimido Nanogold ($Au_{1.4nm}$)" *Structural Biology*, vol. 109: 39–45.
Gogol et al. (1989). *Biochemistry*, vol. 28: 4709–4716.
Gogol et al. (1989). *Biochemistry*, vol. 28: 4717–4724.
Hainfeld et al. (1992). "Site–specific cluster labels" *Ultramicroscopy*, vol. 46: 135–144.
Hainfeld et al. (1992). "A 1.4–nm Gold Cluster Covalently Attached to Antibodies Improved Immunolabeling" *The Journal of Histochemistry and Cytochemistry*, vol. 40(2): 177–184.
Jensen et al. (1998). "Single–particle selection and alignment with heavy atom cluster–antibody conjugates" *Proc. Natl. Acad. Sci. USA*, vol. 95: 9262–9267.
Lyons et al. (1990). "Site–specific attachment to recombinant antibodies via introduced surfaced cysteine residues" *Protein Engineering*, vol. 3(3): 703–708.

Radermacher et al. (1992). *Biophys. J.*, vol. 61: 936–940.
Ribroux et al. (1996). "Use of Nanogold—and Florescent—labeled antibody Fv Fragments in Immunocytochemistry" *Histocytochemistry and Cytochemistry*, vol. 44(3): 207–213.
Starink et al. (1995). "Three–Dimensional Localization of Immunogold Markers Using Two Tiles Electron Microscope Recordings" *Biophysical Journal*, vol. 68: 2171–2180.
Thygesen et al. (1996). *Structure*, vol. 4: 513–518.
Wagenknecht et al. (1994). "localization of Calmodulin Binding Sites on the Ryanodine Receptor from Skeletal Muscle by Electron Microscopy" *Biophysical Journal*, vol. 67: 2286–2295.
Wilkens et al. (1992). "Monomaleimidogold Labeling of the $\gamma$ Subunit of the *Escherichia coli* $F_1$ ATPase Examined by Cryoelectron Microscopy" *Arch. Biochem. Biophys.*, vol. 299(1): 105–109.
Schneider et al., "$Ta_6 Br_{14}$ is a Useful Cluster Compound for Isomorphous Replacement in Protein Crystallography," *Acta Cryst.*, D50:186–191 (1994).
Vogel et al., "Envelope Structure of Semliki Forest virus reconstructed from cryo–electron micrographs," *Nature*, 320:533–535 (Apr. 10, 1986).

*Primary Examiner*—Marianne P. Allen
*Assistant Examiner*—Channing S. Mahatan
(74) *Attorney, Agent, or Firm*—Bret E. Field; Bozicevic, Field & Francis (57) ABSTRACT

Methods and compositions for determining the three dimensional structure of a particle are provided. In the subject methods, a plurality of images of the identically heavy atom labeled particles of interest is obtained. Each of the images in the plurality is obtained by rigidly attaching at least four heavy atom clusters to the particle of interest and imaging the particle in an electron microscope. The three-dimensional structure of the particle is then derived from the plurality of images of the labeled particle. This derivation step preferably includes an alignment step in which the orientation of the images is determined using the heavy atom cluster projections. In preferred embodiments, the heavy atom clusters serve to reveal particle homogeneity, particle location, particle orientation, image artifacts, and image parameters required for computational image restoration. The subject methods are particularly suited for use in determining the three dimensional structure of biological particles, e.g. proteins.

11 Claims, 7 Drawing Sheets

FIG. 1

Flow Chart for Algorithm #1

The procedure requires imaging the particle twice, with each image being a projection view from a different angle. If the axis of rotation and rotation angle relating the two images is known, a set of three-dimensional coordinates for each marker in a common coordinate system can be determined for each particle as follows:

The three-dimensional relationship of the markers is now stored in the "x," "y," and "z" coordinates of the markers in the "untilted" image coordinate system. Increasingly accurate determinations may be obtained by averaging the results from many particles. To do so, one must put the marker coordinates derived from each particle into a standardized form to prepare them to be averaged with other, similarly standardized coordinates:

FIG. 2

Flow Chart for Algorithm #2

Coordinates of markers in their standardized form (before any rotation) are shown without primes, while coordinates observed in the image (after rotation) are shown with primes. Angles are as described in the accompanying text.

---

Translate the marker coordinates so that the origin is at the average (center of mass) coordinate pair.

↓

Find candidate rotation angles from each possible permutation of the order of the markers as follows:

↓

Determine an initial estimate of the angle gamma from the coordinates of the marker being considered as marker #1 with the following equation:

$$\gamma = \tan^{-1}\left(\frac{y'_1}{x'_1}\right)$$

↓

Determine an initial estimate of the angle beta from gamma and the coordinates of the marker being considered as marker #1:

$$\beta = \cos^{-1}\left(\frac{x'_1}{x_1 \cos\gamma}\right)$$

↓

For each combination of the two possible signs of gamma and beta, determine an initial estimate of alpha from the coordinates of the marker being considered as marker #2 with the following equations:

$$r = \sqrt{(x'_2)^2 + (y'_2)^2}$$

$$\theta = \tan^{-1}\left(\frac{y'_2}{x'_2}\right)$$

$$y''_2 = r\sin(\theta - \gamma)$$

$$\alpha = \cos^{-1}\left(\frac{y''_2}{y_2}\right)$$

Using these initial estimates of alpha, beta, and gamma, rotate the original, standardized marker coordinates with these angles and quantify the agreement between the predicted and the observed projection patterns. If these patterns agree to within a predefined threshold, refine the initial angle estimates by least squares error minimization:

$$\chi^2 = [x'_1 - x_1 \cos(\gamma)\cos(\beta)]^2 + [y'_1 - x_1 \sin(\gamma)\cos(\beta)]^2 + ...$$

$$\theta_{refined} = \theta_{initial} - p \left( \frac{\frac{\partial}{\partial \theta}\chi^2}{\frac{\partial^2}{\partial \theta^2}\chi^2} \right)$$

↓

After refinement, evaluate again the agreement of the predicted and observed projection patterns. If the agreement is within a predefined threshold, store the resulting set of refined, candidate rotation angles for future comparison with all other sets.

↓

Once all candidate angle sets are determined, search the list to find sets which are more similar than a predetermined threshold. If they are similar, consider them as different approximations to a unique answer, and retain only the set which gives the closer match between predicted and observed projection patterns.

↓

If more than one set of candidate angles remains, report the projection pattern as being "ambiguous." If there is only one set left, report that set as the unique rotation angles desired. If there are no angle sets found which give acceptable agreement between predicted and observed projection patterns, report the projection pattern as being "unmatched."

Coordinate systems and rotation angles. The primes coordinate system x', y', z' represents the lab reference frame, and the position r' ($x_i'$, $y_i'$) is the projection of a cluster with coordinates r ($x_i$, $y_i$ and $z_i$) in the particle coordinate system after the particle has been rotated by the angles gamma, then beta, then alpha. Such a point not on the particle x-axis will travel along a circular pathway as alpha varies at constant beta and gamma. The projection of this circle only to the x'y' plane is an ellipse.

FIG. 6

Table 1. Statistics for the simulated alignment of 500 randomly rotated particles of each of 500 randomly generated configurations with four clusters per particle

| Noise, Å | % correctly matched | % mistakenly matched | Median angular error for correct matches, * | % deformed particles excluded (45° domain shift) |
|---|---|---|---|---|
| 0 | 100.0 | 0.00 | 0.00 | 99.9 |
| 1 | 96.2 | 0.04 | 0.25 | 99.2 |
| 2 | 91.8 | 0.26 | 0.50 | 98.3 |
| 3 | 85.6 | 0.73 | 0.75 | 97.3 |
| 4 | 81.5 | 1.10 | 0.99 | 96.0 |
| 5 | 75.6 | 1.91 | 1.26 | 94.6 |
| 6 | 70.6 | 2.47 | 1.49 | 93.1 |
| 7 | 64.2 | 3.29 | 1.73 | 91.4 |

In cases where the absolute value of $\beta$ was over 81° ( see *Appendix* for the definition of $\alpha$, $\beta$ and $\gamma$), $\alpha$ and $\gamma$ were either added or subtracted before calculating an error, because as $\beta$ approached 90° or -90° only the sum or difference of these angles is geometrically relevant, respectively.

FIG. 7

METHODS FOR USE IN THREE-DIMENSIONAL STRUCTURAL DETERMINATION

CROSS REFERENCE TO RELATED APPLICATIONS

Pursuant to 35 U.S.C. §119(e), this application claims priority to the filing date of U.S. Provisional Patent Application Serial No. 60/137,886 filed Jun. 7, 1999, the disclosure of which is herein incorporated by reference.

ACKNOWLEDGMENT

This invention was made with United States Government support under Grant No. NIH AI21144 awarded by National Institutes of Health and Grant No. GM07365 awarded by the National Institute of General Medical Sciences at the National Institutes of Health. The United States Government has certain rights in this invention.

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever.

INTRODUCTION

1. Technical Field

The field of this invention is structural biology.

2. Background of the Invention

The identification of the three-dimensional structure of proteins and other biological molecules is of intense interest in biology, pharmacology and related fields (both academic and industrial), as the three-dimensional structure can have a profound effect on biological activity, e.g. binding characteristics, catalytic activity, etc. Accordingly, much effort has been expended in the development of methods for determining the three-dimensional structure of biological particles of interest, such as proteins.

Electron microscopy has been widely employed in structure determinations of biological specimens. While electron microscopy has been employed with some success to determine the structure of proteins, electron microscopy of biological specimens is limited in resolution by beam-induced specimen damage because single organic molecules are destroyed by electron irradiation sufficient to reveal structural details. In addition to damaging the specimen, even low electron doses impair the quality of electron imaging by causing localized heating, specimen movement, and specimen charging. These difficulties can be overcome by image averaging and optimized data collection techniques.

Image averaging to improve the signal-to-noise ratio of low-dose electron micrographs has been accomplished by diffraction from ordered arrays of molecules or by computational methods of aligning the images of single particles. While the diffraction approach has yielded structural information for several specimens, the necessity of forming a crystalline specimen is a severe impediment, as it prevents the study of a great many biological objects, including partially irregular or inhomogeneous molecules and molecular complexes. The very large multi-protein complexes of most biological interest are especially prone to these limitations.

Escape from the requirement for crystals by computational alignment of single particles relies on the detection of image details to determine the relative orientations of the particles and permit image averaging. The very paucity of detail in a low dose electron micrograph that necessitates averaging unavoidably limits the precision of alignment for the purpose of averaging. Alignment in currently employed protocols is enhanced by recording images at high defocus values, which results in a loss of contrast at high resolution.

As such, there is continued interest in the development of new methodologies for determining the three dimensional structure of proteins and other biological particles. Of particular interest would be the development of a cryoelectron microscopy protocol that did not suffer from the disadvantages from which current cryoelectron microscopy protocols suffer, such as low resolution, high computational demands, and excessive human demands.

Relevant Literature

Articles of interest include: Jensen & Kornberg, Proc. Nat'l Acad. Sci. USA (August 1998) 95: 9262–9267; Boisset et al., Structural Biology (1992) 109:39–45; Starink et al., Biophysical Journal (May 1995) 68:2171–2180; Wagenknecht et al., Biophysical Journal (December 1994) 67:2286–2295; and Wilkens et al., Arch. Biochem. Biophys. (Nov. 15, 1992) 299:105–109. Also of interest are: Ribroux et al., J. Histocytochemistry and Cytochemistry (1996) 44: 207–213; Thygesen et al., Structure (May 15, 1996) 4:513–518; and Lyons et al., Protein Engineering (1990) 3:703–708. Additional articles disclosing cryoelectron microscopy methods include: Radermacher et al., Biophys J. (1992) 61:936–940; Gogol et al., Biochemistry (1989) 28:4709–4716; and Gogol et al., Biochemistry (1989) 28:4717–4724.

SUMMARY OF THE INVENTION

Methods and compositions for determining the three dimensional structure of a particle are provided. In the subject methods, at least four heavy atom clusters are rigidly attached to the particle of interest. An image of the heavy atom cluster labeled particle is then obtained by electron microscopy. The obtained image is then used in conjunction with a plurality of like images to determine the three-dimensional structure of the particle of interest. In preferred embodiments, this three-dimensional structure determination step includes an alignment step in which the orientation of the images employed in the structural determination is first determined based on the heavy atom cluster projections. The subject methods are particularly suited for use in determining the three-imensional structure of biological particles, e.g. proteins.

DESCRIPTION OF THE SPECIFIC EMBODIMENTS

Methods and compositions for determining the three-imensional structure of a particle are provided. In the subject methods, a plurality of electron microscope generated images of identically heavy atom labeled particles of interest is taken with an electron microscope. The three-dimensional structure of the particle is then derived from the plurality of images of the labeled particle. This derivation step preferably includes an alignment step in which the orientation of the images is determined using the heavy atom cluster projections in the micrographs and knowledge of the relative three-dimensional coordinates of the heavy atom clusters. The subject methods are particularly suited for use in determining the three-imensional structure of biological particles, e.g. proteins. In further describing the subject invention, the process for labeling the particle of interest with heavy atom clusters is described first, followed by a discussion of image procurement and processing steps of the subject invention.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Particle Labeling

As summarized above, the subject invention is directed to a method of determining the three-dimensional structure of a particle using heavy atom clusters that are rigidly attached to the surface of the particle of interest during electron microscope imaging. As such, the preparation of heavy atom cluster labeled particles is a key step in the subject methods.

Particles which are amenable to structural determination by the subject methods are microparticles, where the term "microparticles" refers to particles having a size of at least about 100 atoms, usually at least about 10 kDa and more usually at least about 30 kDa, where the size may be as large as 10 MDa or larger, but usually does not exceed about 100 MDa and more usually does not exceed about 1 GDa. Of particular interest is the three-dimensional structural determination of biological particles with the subject methods. Biological particles that may be analyzed according to the subject invention include individual molecules and stable binding complexes of two or more particles, e.g. proteins. Of particular interest is the use of the subject methods to determine the structure of proteins and stable binding complexes thereof, though other biological molecules, such as carbohydrates, lipoproteins, nucleic acids, and the like, can be analyzed as well according to the subject methods. An example of a stable binding complex includes two or more molecules of interest, e.g. proteins, bound together. Stable binding complexes also include a first structure of interest, e.g. a protein or complex of two or more proteins, which is bound by a large linker group to which is attached the at least four heavy atom clusters, where linker group and heavy atom clusters are described in greater detail infra.

Figure 1:
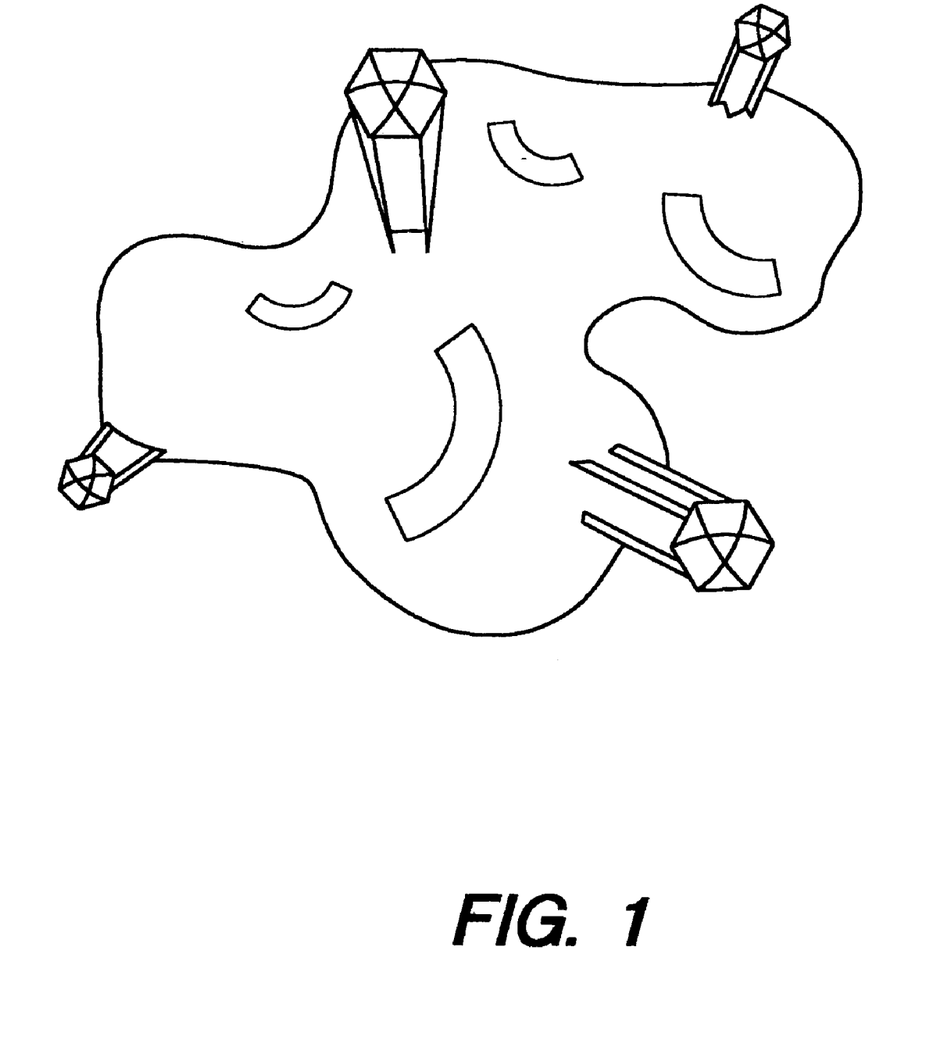
FIG. 1 provides a representation of a protein labeled with four rigidly attached heavy atom clusters.

The first step in the subject methods is to rigidly attach at least four heavy atom clusters to the surface of the particle of interest. In many embodiments, e.g. for non-symmetrical particles, the heavy atom clusters are attached in such a manner so as to be non-symmetrically distributed across the surface of the particle. By non-symmetrically distributed is meant that a plane can not be formed by any given four clusters that are rigidly attached to the particle surface. See FIG. 1. Non-symmetrically also means that the clusters are not arranged in a tetrahedron, and no set of three clusters forms an equilateral triangle. While at least 4 labels are attached to the particle of interest in the subject methods, the number of rigidly attached clusters may be higher. As such, the number of rigidly attached clusters may range from about 4 to 60, usually from about 4 to 8 and more usually from about 4 to 5, while in many instances the number of rigidly attached clusters will be 4.

The heavy atom clusters that are rigidly attached to the particle of interest in the subject methods should be clearly visible in an electron microscrope generated image of the particle, where the image is taken at low dose, i.e. at high resolution. By "low dose" is meant that the magnitude of the electron irradiation does not exceed about 1000 $e^-/Å^2$, usually does not exceed about 200 $e^-/Å^2$ and more usually does not exceed about 20 $e^-/Å^2$. Preferably, the heavy atom cluster is one that has the smallest size which is still clearly visible under the above described low dose and close to focus conditions. In many embodiments, the mass of the subject particles ranges from about 6 to 500 kDa, usually from about 8 to 50 kDa and more usually from about 10 to 20 kDa. A number of heavy atom clusters are known to those of skill in the art which are suitable for use in the present methods, where known heavy atom clusters include Au, Au/Ag alloy, W and Pd atom clusters. Specific heavy atom clusters of interest include: NANOGOLD® particles (clusters of 67 gold atoms in an approximately spherical volume of 14 Å diameter, $Au_{67}$); $Au_{39}$; Au/Ag alloys of 25, 37 and 38 heavy atoms; $W_{30}$ and $Pd_{38}$.

As mentioned above, the heavy atom clusters are rigidly attached to the particle surface. By rigidly attached is meant the clusters are substantially locked into a fixed position in space relative to the particle surface to which they are attached, such that there is not a significant degree of random movement of the cluster relative to the surface when the cluster is attached. In other words, the heavy atom clusters are not capable of substantial independent or random movement in space once attached to the particle surface. For example, translational movement of the rigidly attached heavy atom cluster is severely restricted, if not completely eliminated, following attachment to the particle surface. For many embodiments, e.g. atomic resolution, the amount of movement that may be tolerated does not exceed about 4 Å. However, in other embodiments such as low resolution imaging or imaging of large particles, more movement may be tolerated.

The clusters may be rigidly attached to the surface of the particle of interest either directly or through a binder, attachment or linker group which serves to rigidly link or connect the heavy atom cluster to the particle surface. When directly attached, the clusters are stably associated with moieties present on the particle surface, such as atoms which are capable of stably attaching, e.g. through covalent coupling, to the heavy atom clusters. Moieties on the surface of the particle which may be capable of directly stably associating with heavy atom clusters, e.g. through covalent linkage, include: —SH, hydrophobic or charged surface areas, etc. For direct attachment, the particle of interest is contacted with the heavy atom cluster under conditions appropriate for attachment to occur, e.g. by immersing the particle in a fluid solution of the heavy atom cluster.

In many preferred embodiments, the heavy atom cluster is indirectly attached through a binder, linker or attachment moiety or group that serves to attach or link the heavy atom cluster to the surface of the particle of interest. In other words, the heavy atom cluster is present in the form of a conjugate with a binder, linker, adaptor or attachment molecule. In these embodiments, the heavy atom cluster is stably associated with the adaptor moiety, where by "stable association" is meant that the linkage between the heavy atom cluster and the adaptor molecule is stable under the conditions of the subject methods. Stable association may be accomplished by specific or covalent binding of the cluster to the adaptor, but will generally be accomplished via covalent binding of the cluster to a suitable functional group on the adaptor, e.g. —SH of a cysteine residue where the adaptor is a protein. The adaptor should at least provide for the requisite rigid fixation of the cluster to the particle of interest. As such, suitable adaptors are not flexible adaptors, by which is meant that they do not bend or readily assume random and different configurations. The length of the adaptor should provide for an acceptable distance between the cluster and the particle when rigidly attached. As such, the length of the adaptor generally ranges from about 1 to 1000 Å, usually from about 5 to 100 Å and more usually from about 10 to 30 Å. The adaptor or linker molecule should also be capable of recognizing and binding to a specific site on the surface of the particle of interest, such that a homogenous collection of labeled particles can be produced, where by homogenous is meant that the heavy atom clusters are attached to the same surface locations on each of the particles in a labeled collection of particles. While the adaptor may be any convenient molecule meeting the above criteria, in many embodiments of the subject invention the adaptor is a polypeptide, where antibody fragments are of particular interest, as they are capable of recognizing and binding to specific antigenic determinants on the surface of the particle.

Antibody fragments, specifically Fv fragments and single chain Fvs (scFvs), are of particular interest as these fragments provide a constant region or domain to which the heavy atom cluster may be attached and a variable region or domain which recognizes and stably attaches to a complementary domain or epitope present on the surface of the particle via specific binding interactions. Suitable antibody derived adaptors, such as Fv and scFv adaptors, can be prepared using any convenient protocol.

One convenient means of preparing Fv and scFv adaptors is through the use of phage display, in which a library of different antibody fragments are displayed on the surface of phage particles, i.e. a phage display library, and then assayed in a process known to those of skill in the art as "biopanning" against the particle of interest to identify suitable antibody fragments that bind specifically to the particle of interest. Methods of producing and screening a library of antibody fragments using phage display are well known to those of skill in the art. See Marks et al., "By-passing immunization. Human antibodies from V-gene libraries displayed onphage," J Mol Biol (Dec. 5 1991) 222(3):581–97; Clackson et al., Nature (Aug. 15 1991) August(6336):624–8; Griffiths et al., "Human anti-self antibodies with high specificity from phage display libraries," EMBO J Feb. 12, 1993 (2):725–34; Hoogenboom & Winter, J Mol Biol (Sep. 20, 1992) 227(2):381–8; Riechmann et al., "Phage display and selection of a site-irected randomized single-chain antibody Fv fragment for its affinity improvement," Biochemistry (Aug. 31 1993) 32(34):8848–55; Winter et al., "Making antibodies by phage display technology," Annu Rev Immunol (1994) 12:433–55; Gram et al., "In vitro selection and affinity maturation of antibodies from a naive combinatorial immunoglobulin library," Proc Natl Acad Sci U S A (Apr. 15, 1992) 89(8):3576–80; Davies et al., "Selection of specific phage-display antibodies using libraries derived from chicken immunoglobulin genes," J Immunol Methods (Oct. 12, 1995)186(l):125–35; McCafferty et al., "Phage antibodies: filamentous phage displaying antibody variable domain," Nature (Dec. 6, 1990) 348(6301):552–4. See also U.S. Pat. Nos. 5,885,793 and 5,516,637, the disclosures of which are herein incorporated by reference.

In general, preparation of the phage displayed antibody fragments, such as scFv fragments, includes the following steps: (1) preparation of a library of rearranged immunoglubulin genes, where this step may include harvesting cDNAs encoding the various fragments or domains of the antibody fragment, e.g. variable regions, constant or framework regions, etc., to be displayed on the phage surface, where these initial cDNAs may be harvested from appropriate cells, e.g. B-lymphocytes, spleen cells, etc., from an immunized or non-immunized source (where the source may be any convenient source, such as mouse, rat, chicken, human etc.); (2) insertion of the rearranged library into phage display vectors, e.g. phage vectors, phagemid vectors, etc; (3) production of the phage display library of phage expressing antibody fragments on their surface; and (4) screening the library for selection of those phage which harbor a nucleic acid sequence encoding an antibody fragment of desired affinity and specificity for the particle of interest. For further review of the well known procedures for generating antibody fragments for use as adaptors using phage display protocols, see. Kay et al., *Phage Display of Peptides and Proteins, a Laboratory Manual* (Academic Press)(1996) Chapter 6, pp 79–110.

In many embodiments, the antibody fragment that is to serve as the adaptor molecule is engineered to include or incorporate suitable binding moieties or chemical functionalities for binding to the heavy atom clusters. For example, the framework region of the antibody fragment may be modified to incorporate one or more surface cysteine residues which provide —SH moieties that are available for covalent binding to heavy atom clusters. Desired functional groups can be introduced using site directed mutagenesis protocols, such as those described in Lyons et al., Protein Engineering (1990) 3:703–708. Examples of protocols for site specific mutagenesis may also be found in Gustin et al. (1993), *Biotechniques* 14:22; Barany (1985), *Gene* 37:111–23; Colicelli et al. (1985), *Mol. Gen. Genet.* 199:537–9; and Prentki et al. (1984), *Gene* 29:303–13. Methods for site specific mutagenesis can be found in Sambrook et al, *Molecular Cloning: A Laboratory Manual*, CSH Press 1989, pp. 15.3–15.108; Weiner et al. (1993), *Gene* 126:35–41; Sayers et al. (1992), *Biotechniques* 13:592–6; Jones and Winistorfer (1992), *Biotechniques*

12:528–30; Barton et al. (1990), *Nucleic Acids Res* 18:7349–55; Marotti and Tomich (1989), *Gene Anal. Tech.* 6:67–70; and Zhu (1989), *Anal Biochem* 177:1204.

For attachment of the heavy atom clusters to the particle of interest, the particle is contacted with the heavy atoms clusters, which may or may not include an adaptor molecule, under conditions sufficient for rigid attachment of the heavy atom cluster or label to the particle surface to occur, e.g. under buffer and temperature conditions that promote binding of the clusters to the particle. For example, where the heavy atom clusters are directly attached to the particle, a purified preparation of the particle is combined with a fluid preparation of the heavy atom clusters and incubated for a period of time sufficient for direct attachment to occur. Where an adaptor is employed to provide for the rigid attachment, such as an scFv, which has specificity for the particle of interest, a fluid composition of the particle of interest, which may be a heterogenous composition or a substantially homogenous composition, is contacted with the adaptor/heavy atom cluster conjugates under conditions sufficient for specific binding interactions between the adaptors and the particles of interest to occur. Contact of the heavy atom clusters with the particles of interest under appropriate conditions results in the production of heavy atom cluster labeled particles.

Image Procurement

Following preparation of the cluster labeled particles, the next step in the subject methods is to obtain and record a plurality of electron microscope generated images of a plurality of identical heavy atom labeled particles, prepared as described supra. The electron microscope generated images are obtained using conventional cryoelectron microscopy techniques. Cryoelectron microscopy techniques are known to those of skill in the art, and reported in: Radermacher et al., Biophys J. (1992) 61:936–940; Gogol et al., Biochemistry (1989)28:4709–4716; and Gogol et al., Biochemistry (1989) 28:4717–4724. See also Frank, Joachim, *Three Dimensional Electron Microscopy of Molecular Assemblies* (Academic Press)(1996).

To obtain the requisite images via cryoelectron microscopy, a thin layer comprising a plurality of identically labeled particles fixed in a suitable fixation medium, e.g. vitreous ice, glucose, and the like is prepared. The thickness of this thin layer typically ranges from about 10 to 5000 Å, usually from about 100 to 1000 Å and more usually from about 100 to 500 Å. The thin layer of labeled particles may be prepared using any convenient protocol. For example, an aqueous solution of the labeled particle, which may or may not be substantially homogenous for the labeled particle (e.g. a purified particle solution), is deposited onto a specimen support grid, e.g. a metallic grid structure (such as copper) covered with a surface holey carbon layer. The particle may be present in any convenient aqueous solution, such as a Tris buffered solution, e.g. 0.1 M Tris-HCl buffer, pH 8.0, 50 mM NaCl. In certain embodiments, the particle of interest is present in a substantially homogeneous composition. In other embodiments, the particle of interest is present in a heterogeneous composition, which comprises a plurality of other particles not of interest. In this latter embodiment, the particle may even be present in vivo, e.g. in a cell. The deposited fluid sample, e.g. solution, comprising the particle of interest is then frozen into a thin, vitreous ice layer on the surface of the support grid, e.g. by contact with liquid ethane. Alternatively, an initial fluid composition comprising the labeled particles can be fixated, e.g. by freezing, exchanging water for fixative, etc., followed by sectioning to produce a thin layer which can then be imaged in an electron microscope. See Dubochet et al., Quarterly Reviews of Biophysics (1988) 21:129–228.

Following preparation of the thin layer, high resolution images of the labeled particles in the thin layer are taken and recorded with an electron microscope. Recordings at different tilt angles for each field may also be taken, e.g. to provide the requisite images for derivation of the three-dimensional coordinates of the rigidly attached clusters with respect to the particle, as described infra. Tilt angles generally range from about 0 to 70°, usually from about 25 to 50°. The images may be taken in any convenient format, such as micrograph, CCD, and the like. Any convenient electron microscope device may be employed for taking the images.

A sufficient number of images are obtained to provide for the requisite number (i.e. plurality) of particle images in different orientations needed to construct a three-dimensional representation of the particle, as described infra. While atomic resolution may require 1000s of images, lower resolution may require the use of fewer images. In a preferred embodiment, random orientations are imaged.

Image Processing

The next and final step in the subject methods is the construction of the three-dimensional structure of the particle from the plurality of collected images or particle projections, i.e. the image processing step. Construction of a three-dimensional structural representation of the particle of interest from the collected plurality of images requires selection and alignment of various individual images followed by derivation of the three dimensional structure of the particle from the various aligned images.

A critical feature of the subject methods is the use of cluster projections of the at least four rigidly attached heavy atom clusters in the particle images to align the particle images which are used to generate the three-dimensional structure. Alignment of the particle images according to the subject methods requires deriving the orientation of the labeled particle image from the relative three-dimensional coordinates of the rigidly attached clusters and the cluster projections in the image. The orientation of the image is determined in terms of the center of each particle in the image and the three rotation angles that characterize the view of the particle in the image.

The three-imensional positions of the heavy-atom clusters on the particle may be determined by recording high-resolution transmission electron microscope images of many individual identical particles, each of which consists of the particle with four or more rigidly attached heavy-atom clusters. One strategy to accomplish this is to record multiple images of the same particles from different perspectives. In this embodiment, a field of particles is imaged without tilting the specimen with respect to the electron beam, and then imaged again after tilting the goniometer of the microscope, where the magnitude of the tilt ranges from about 0 to 70°, usually from about 30 to 50°. These images are used in conjunction with the method or algorithm shown in FIG. 2 and entitled "An algorithm to determine the three-dimensional positions of heavy-atom clusters attached to particles from two, tilted, projection images," to determine the heavy-atom cluster positions.

Figure 2:
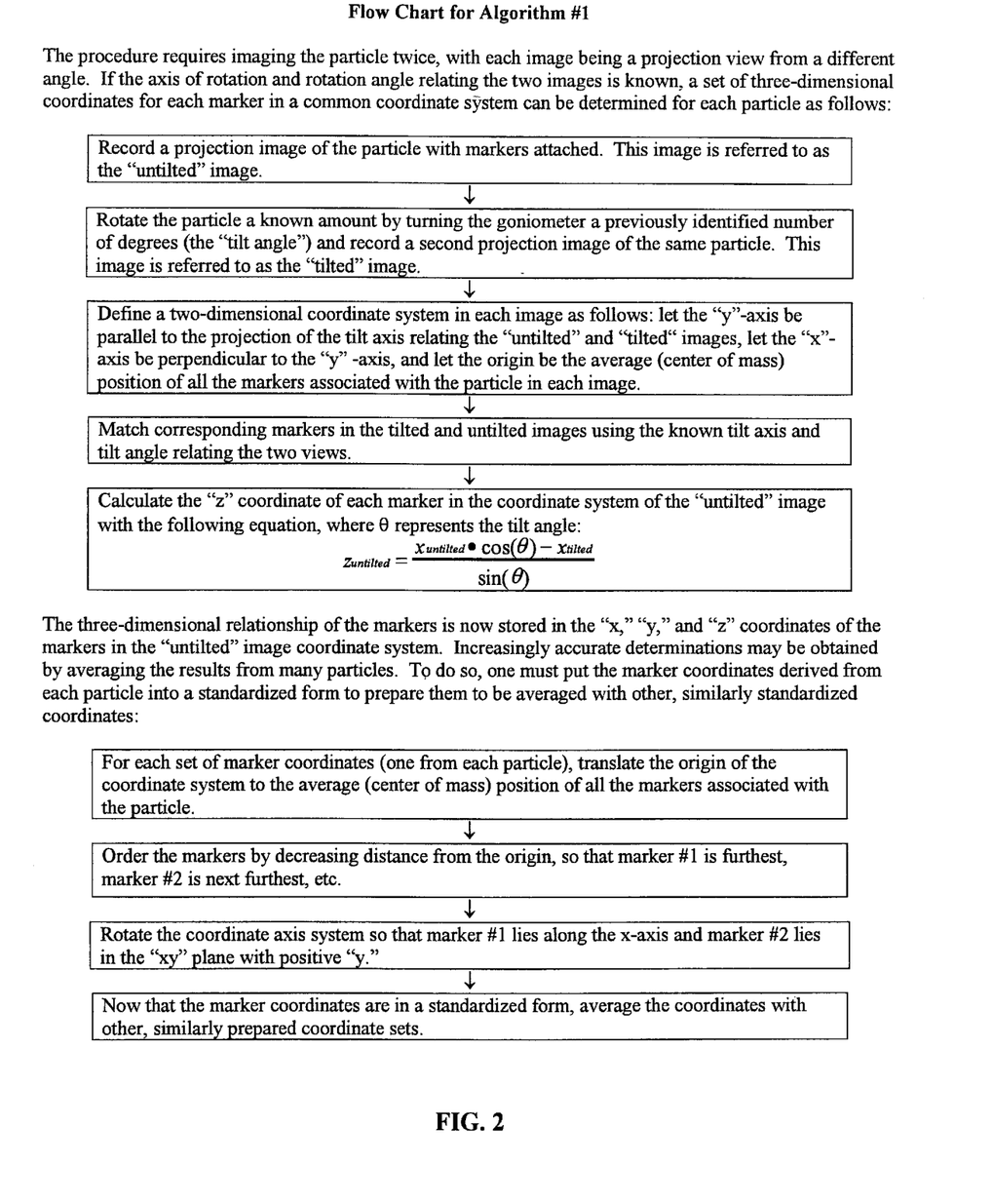
FIG. 2 provides a flow chart of a data analysis method for determining the three-dimensional positions of heavy atom clusters on a particle labeled according to the subject invention, such as the labeled protein represented in FIG. 1.

More specifically, the procedure or method depicted in FIG. 2 requires imaging the particle twice, with each image being a projection view from a different angle. If the axis of rotation and rotation angle relating the two images is known, a set of three-dimensional coordinates for each cluster in a common coordinate system can be determined for each particle as follows. First, a projection image of the particle with clusters attached is recorded. This image is referred to as the "untilted" image. Next, the particle is rotated a known amount by turning the goniometer a previously identified number of degrees (the "tilt angle") and recording a second projection image of the same particle. This image is referred to as the "tilted" image. A two-dimensional coordinate system in each image is then defined as follows: let the "y"-axis be parallel to the projection of the tilt axis relating the "untilted" and "tilted" images, let the "x"-axis be perpendicular to the "y"-axis, and let the origin be the average (center of mass) position of all the clusters associated with the particle in each image. Corresponding clusters are then matched in the tilted and untilted images using the known tilt axis and tilt angle relating the two views. The "z" coordinate of each cluster in the coordinate system of the "untilted" image is then calculated with the following equation, where θ represents the tilt angle:

$$Z = \frac{X_{untilted} \cdot \cos(\theta) - X_{tilted}}{\sin(\theta)}$$

The three-dimensional relationship of the clusters is now stored in the "x," "y," and "z" coordinates of the clusters in the "untilted" image coordinate system. Increasingly accurate determinations may be obtained by averaging the results from many particles. To do so, the cluster coordinates derived from each particle are put into a standardized form to prepare them to be averaged with other, similarly standardized coordinates. Standardization is accomplished as follows. For each set of cluster coordinates (one from each particle), the origin of the coordinate system is translated to the average (center of mass) position of all the clusters associated with the particle. The clusters are then ordered by decreasing distance from the origin, so that cluster #1 is furthest, cluster #2 is next furthest, etc. The coordinate axis system is then rotated so that cluster #1 lies along the x-axis and cluster #2 lies in the "xy" plane with positive "y." The coordinates are then averaged with other, similarly prepared coordinate sets.

Figure 6:
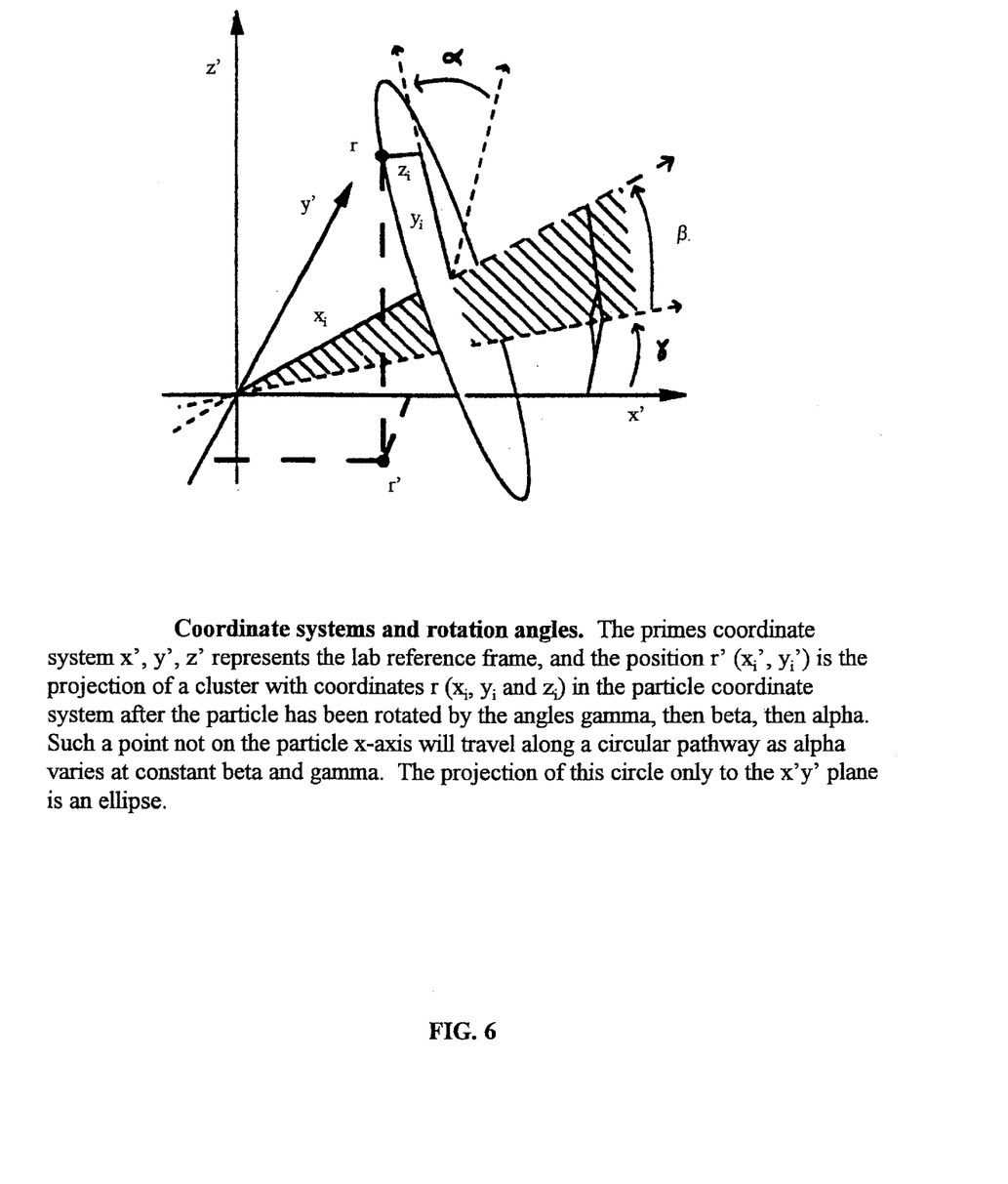
FIG. 6 provides a graphical view of the coordinate systems and rotation angles.

A computer program or algorithm for carrying out the calculations required in the above method depicted in FIG. 6 is provided in Appendix A, infra.

In processing the images to determine the three dimensional structure of the imaged particle, one must first select the appropriate particle images to employ. To select appropriate images, the positions of the heavy-atom cluster images within each picture are located. Location of appropriate images can be done by cross-correlation of the picture with the image of a single heavy-atom cluster, derived either empirically or theoretically. Only the heavy-atom cluster images which appear free of distortions such as drift, astigmatism, inappropriate defocus, etc. are selected. Next, suitable images of the particle are identified and extracted based on the presence of the expected number of heavy-atom clusters close enough together to be attached to the same particle, but far enough away from any other heavy-atom cluster so as to be unambiguously assigned to a unique particle.

Figure 3A:
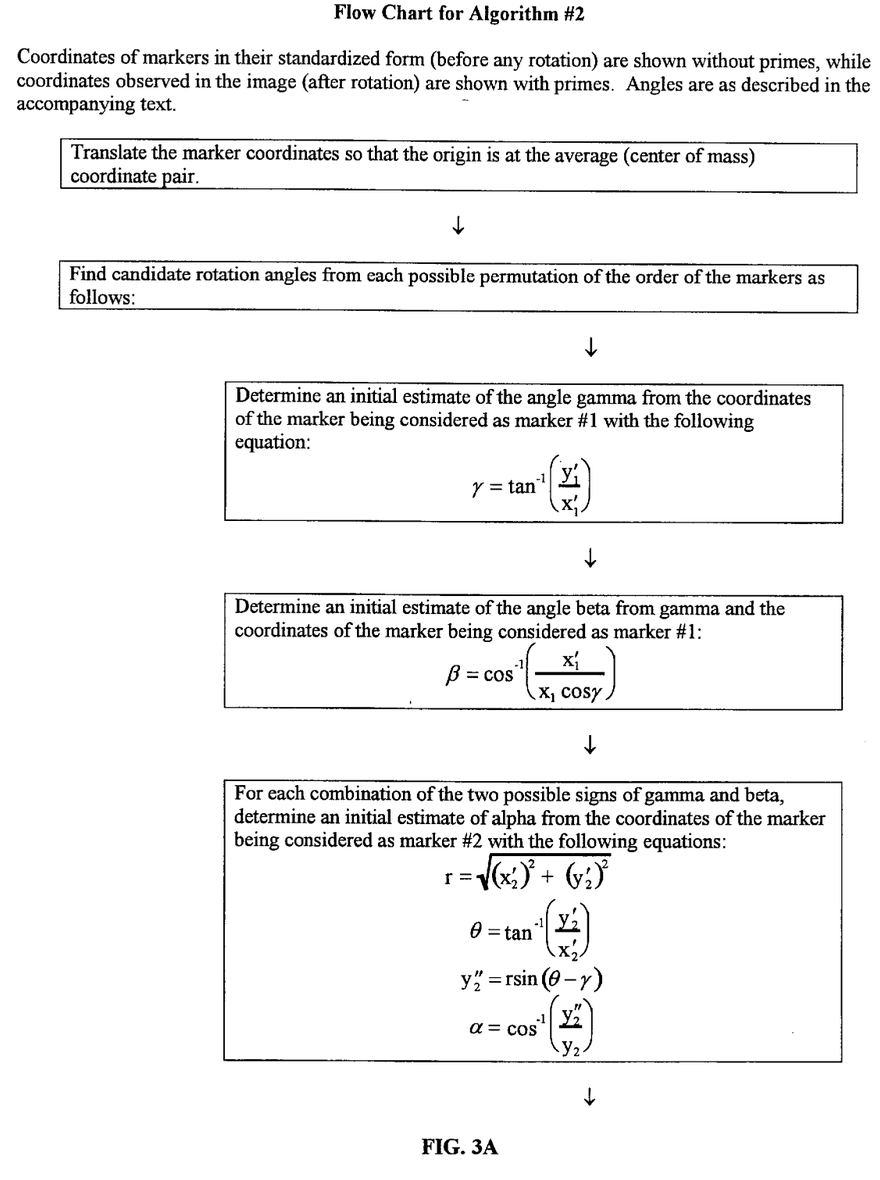
FIG. 3 provides a flow chart of a data analysis method for determining the center of each particle and the three rotation angles that characterize the view from which a labeled particle is imaged during the subject methods.
Figure 3B:
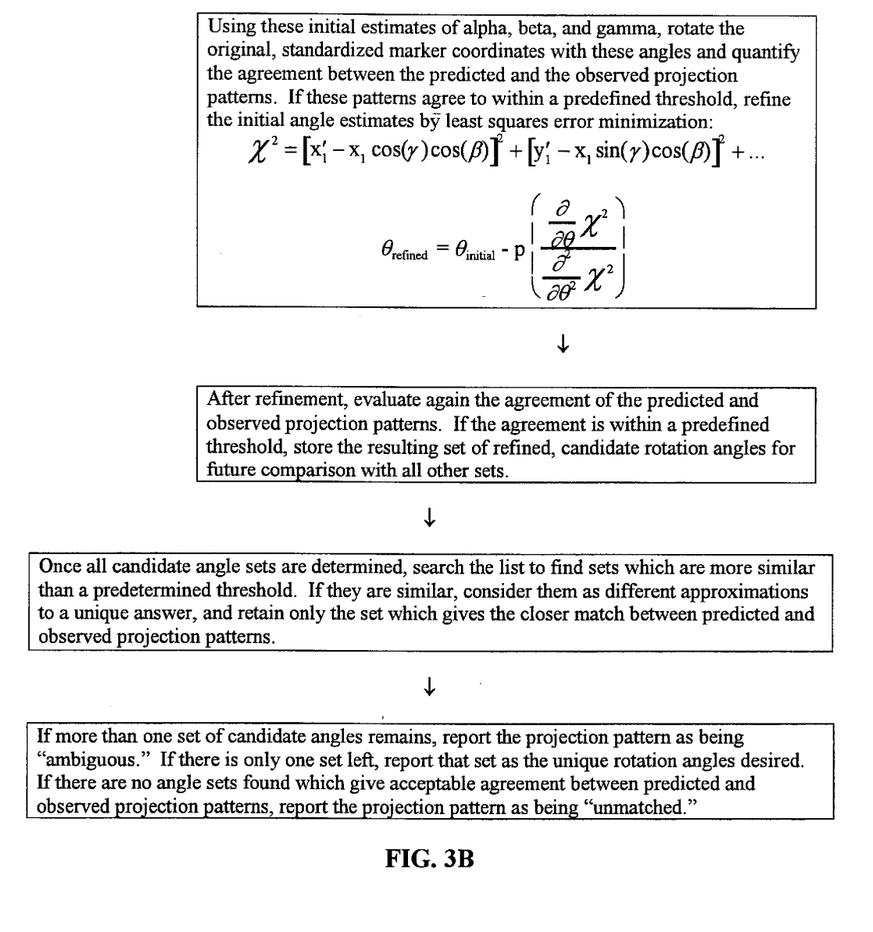

Following selection of the appropriate images, the center of each particle and the three rotation angles characterizing the view from which each particle was imaged are determined. For determining these parameters, the method or algorithm entitled "An algorithm to determine the location and orientation of particle images based on the projected positions of four or more, rigidly attached heavy-atom clusters," and depicted in FIG. 3 may be employed. In the methodology depicted in FIG. 3, the first step is to translate the cluster coordinates so that the origin is at the average (center of mass) coordinate pair. Next, candidate rotation angles, as described in Appendix B, infra, are determined for each possible permutation of the order of the clusters. These angles are determined as follows. In the equations below, the known three-dimensional coordinates of the heavy atom clusters in a standardized format appear without primes, while the measured coordinates after rotation and projection appear with primes. Subscripts refer to which of the four clusters is being used. First, an initial estimate of the angle gamma from the coordinates of the cluster being considered as cluster #1 is determined using the equation:

$$\beta = \cos^{-1}\left(\frac{x'_1}{x_1 \cos\gamma}\right)$$

Next, an initial estimate of the angle beta is determined from the gamma and the coordinates of the cluster being considered as cluster #1 using the equation:

$$\gamma = \tan^{-1}\left(\frac{y_1}{x'_1}\right)$$

Next, an initial estimate of alpha is determined for each combination of the two possible signs of gamma and beta using the coordinates of the maker being considered as cluster #2 with the following equations:

$$\theta = \tan^{-1}\left(\frac{y'_2}{x'_2}\right)$$

$$\alpha = \cos^{-1}\left(\frac{y''_2}{y_2}\right)$$

Using the above determined initial estimates of alpha, beta and gamma, the original, standardized cluster coordinates are rotated with these angles and the agreement between the observed and predicted projection patterns is quantified. If the patterns agree to within a predetermined threshold, the initial angle estimates are refined using a least squares error minimization equation. Typical values for the threshold are 3 Å to 7 Å. After refinement, the agreement between the observed and predicted projection patterns is again determined. If the agreement is within a predefined threshold, the resulting set of refined, candidate rotation angles is stored for future comparison with all other sets. The above procedure or calculation also allows inhomogenous particles to be identified and discarded from the growing set.

Next, the height of each particle with respect to the objective lens of the microscope (the defocus value) is determined. One way to do this is to compare the images of the heavy-atom clusters attached to each particle with a catalogue of similar images of the cluster at varying defocus values. The correctable artifacts in the particle images which arise from imperfections in the microscope optics, the recording media, or other sources, such as the effects of beam tilt, magnification variation, and the oscillations of the contrast transfer function are then corrected using protocols known to those of skill in the art.

A computer program or algorithm for carrying out the calculations required in the above method depicted in FIG. 3 is provided in Appendix C, infra.

The recorded, selected, aligned and corrected images are then used to construct a three-dimensional structural representation of the particle of interest. A variety of different programs are suitable for use in this image analysis step, where such programs include: SPIDER (see Frank et al, supra), and the like.

The subject methods are useful in determining the three dimensional structure of a large variety of different types of particles. Of particular interest is the use of the subject methods to determine the three dimensional structure of proteins or binding complexes thereof. Because of the speed with which the requisite computations can be performed in order to obtain the three dimensional structure of a protein, the subject methods are suitable for use in high throughput settings, in which the three-dimensional structure of a large number of proteins is to be determined in a relatively short period of time.

Also provided by the subject invention are kits for carrying out the subject invention. The kits will may include heavy atom clusters to be used in the subject methods, where the heavy atom clusters may or may not be present as conjugates of an adaptor molecule, depending on whether the clusters are to be directly or indirectly attached to the particle of interest. In those embodiments in which an antibody fragment is employed as an adaptor, the kit will further include a means for producing the heavy atom cluster/antibody fragment conjugates, where such means may include a combinatorial library present in suitable host cells for producing phage displaying antibody fragments on their surface, i.e. an antibody (such as an Fv or scFv) phage display library. Of particular interest is a phage display library which displays antibody fragments that have been engineered to provide for cluster attachment functionality on the constant or framework domain, as described supra. In such embodiments, additional reagents for: (a) screening the library for antibody fragments of interest; (b) cloning and expression of nucleic acids encoding antibody fragments of interest; and (c) conjugating the antibody fragment to the heavy atom cluster; may be included. The kits may further include host cells, helper phage, culture media, and the like. In certain embodiments, the kits will include a computer readable storage medium on which is recorded an algorithm for: (a) determining the relative cluster coordinates of a heavy atom cluster labeled particle, such as the algorithm depicted in FIG. 2; and/or (b) for aligning images of a heavy atom labeled particle, as depicted in FIG. 3. The computer readable storage medium may be any convenient medium, including CD, DAT, floppy disk, etc. Furthermore, the kits will generally include instructional material for carrying the subject methods, where the instructional material may be incorporated into one or more of a package insert, the packaging, the labeling and the like.

The following examples are offered by way of illustration and not by way of limitation.

EXPERIMENTAL

I. Simulations

Four simulations were performed to demonstrate the two stages of selection and alignment and to explore how flexibility in cluster positions and error in location of these positions would compromise the results. The first simulation mimicked the first stage of alignment by determining the relative three-dimensional coordinates of clusters bound to the particle from two simulated, tilted images of a particle field. The second, third, and fourth simulations were variations of the second stage of alignment, and explored the choice of alignment parameters, the median angular alignment error, and the utility of cluster labeling for selection of homogeneous (undeformed) particles, respectively.

Determination of cluster coordinates. The first step in the proposed method would be to label a particle of interest with at least four heavy atom clusters and then determine their relative three-dimensional positions. We simulated determination of the relative cluster positions from two images of a field of particles, one tilted 45° with respect to the other. Flexibility in cluster positions was represented by a "cluster-noise" parameter, which defines the maximum, random, radial displacement of a cluster from its assigned location. In addition, an "EM-noise" parameter was introduced to model the maximum, random, radial error in locating the center of a heavy atom cluster in a micrograph. The algorithm was to generate a model particle with random cluster locations on the surface, rotate it in space by three random rotation angles, displace the cluster positions randomly within a sphere of radius "cluster-noise," record projection coordinates including a random "EM-noise" displacement, rotate the particle by an additional 45° about a known tilt axis, record a second set of projection coordinates including another random "EM-noise" displacement, and finally calculate x, y, and z coordinates for each cluster based on these two sets of projection coordinates. We assumed in the simulation that corresponding particles and clusters in the tilted images were previously identified as well as the direction and magnitude of tilt, noting that algorithms for these tasks are routine and well established (Frank et al., J. Struct. Biol. (1996) 116:190–199; Starink et al., Biophys. (1995) 68:2171–2180; Skoglund et al., Nature (London) (1986) 319:560–564). The accuracy of the procedure then depends mostly on the uniformity of cluster positions with respect to the particle (cluster-noise), on the precision to which clusters can be located in the micrograph (EM-noise), and on the number of particles averaged.

Figure 4:
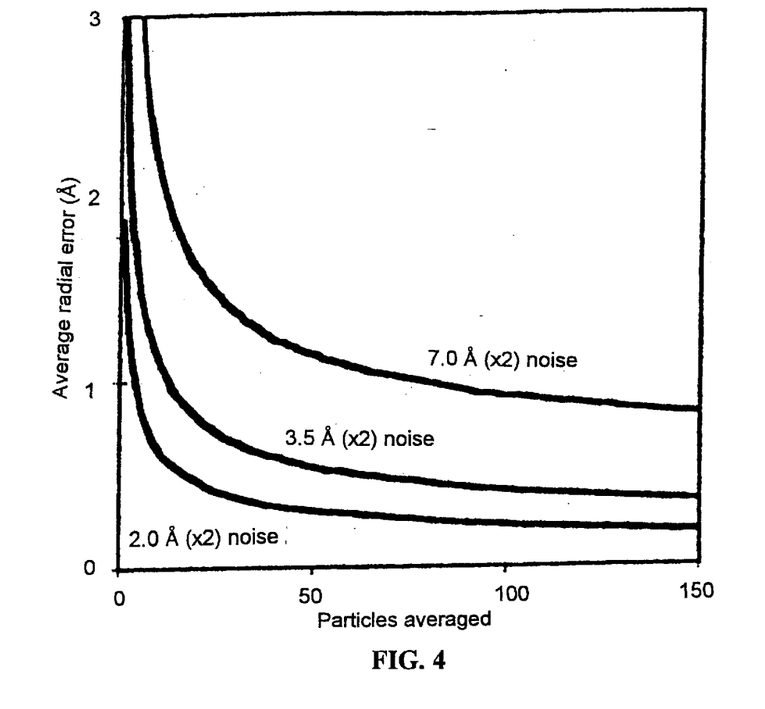
FIG. 4 provides a graphical view of the accuracy of original cluster coordinate determination.

The resulting cluster coordinates for each succeeding particle were averaged into a running model, and the average radial coordinate error for any particular cluster after n particles was averaged with 500 different iterations of this algorithm using different, randomly derived, cluster configurations (FIG. 4). The maximum and minimum radial cluster coordinates (100 Å and 60 Å, respectively) were appropriate for a 500 kDa protein of expected radius 52 Å, with an additional radial extension of 28 Å due to the scFv. Randomness was constrained by a minimum cluster-cluster distance of 38 Å, the diameter of an scFv. This simulation showed, for example, that if the center of the heavy atom cluster is free to move on the surface of the scFv within a sphere of radius 7 Å (the radius of Nanogold), and if we can determine the position of the center of the heavy atom cluster on the micrograph to within 7 Å, it would take about 75 particle pairs to determine the original three-dimensional coordinates of the clusters to within 1 Å, given perfect knowledge of the direction and magnitude of tilt. Of course, a tilt series including multiple tilts could also be taken to reduce the number of particles needed.

Alignment parameters. Once the relative positions of clusters on a particle are known, these can be used to select and align the projections of randomly rotated particles. For the second, third, and fourth simulations a program was written to demonstrate and explore this process. The algorithm generated a random cluster configuration as described, rotated it by random angles, recorded the cluster projection pattern with random displacements to simulate noise, and searched for the rotation angle sets that gave rise to the observed projection pattern. When no noise was added, all particles were uniquely matched to exact rotation angles, and particle deformities were easily detected (Table 1, row 1) (Table 1) is provided in FIG. 7.

In the presence of noise, however, a particular particle rotation can result in a range of observed projection patterns, and criteria were established to decide whether or not a set of rotation angles and its corresponding projection pattern (as predicted from the cluster coordinates) "matched" the observed, noisy pattern. First, the "spatial match error" was defined as the maximum radial coordinate error seen between a pair of corresponding clusters in the two patterns. The first alignment parameter was then called the "spatial match threshold," and was defined as the largest spatial match error that could exist between two projection patterns for them to be considered as arising from the same set of rotation angles. Thus for a projection pattern to be matched to a set of rotation angles, each cluster on the particle was required to have a predicted position within the spatial match threshold of a corresponding observed cluster position.

Further ambiguities arose in the assignment of matches because projection patterns varied continuously with rotation angle and because projection patterns resulting from widely separated sets of rotation angles were in some cases nearly identical. For any particular noisy projection pattern, there were either no sets of rotation angles, one set, or more than one set found that fell within the spatial match threshold. In cases where there were more than one, either the sets were close together in angular space, representing different approximations to the correct rotation angles with varying accuracy, or the sets were widely separated and demonstrated true ambiguity. A second alignment parameter, the "angular ambiguity threshold," was therefore defined as the maximum angular difference in any rotation angle between two sets of rotation angles that was allowed for the two sets to be considered as different approximations of a single, unique match. If any difference in any rotation angle between two angular sets that matched a projection pattern was greater than the angular ambiguity threshold, the pattern was regarded as ambiguous, and the particle could not be uniquely aligned by this method. Reasonable values for the angular ambiguity threshold for a particular level of noise were chosen as a minimum of 2° plus twice the expected angular alignment error, which is the inverse sine of the average noise (half the maximum) divided by the average radial coordinate (80 Å here).

With these alignment parameters defined, there were four possible outcomes for each particle projection in the simulations. The first is that the projection was uniquely matched to a set of rotation angles close to the actual angles used to rotate the particle ("correctly matched"). The second is that the projection was ambiguous, meaning that more than one set of matching angles, further apart than the angular ambiguity threshold, was found ("ambiguous"). The third is that no matches were found, which occurred when the introduction of noise perturbed the projection pattern outside the spatial match threshold, and these particles were erroneously discarded as deformed ("unmatched"). The fourth possibility was that the correct set of angles was not found, but an erroneous set of angles did happen to match ("mistakenly matched"). This last category of projections was identified because the unique match angles obtained were much different from those actually used to produce the patterns. Such mistakenly matched particles would add a small amount of random noise to a final 3-D reconstruction, as their angles are completely unrelated to the correct angles.

The results of earlier simulations showed that for typical cluster configurations, less than 20% of random projections were ambiguous for moderate spatial match thresholds. Because at high resolution, continuous missing cones of reciprocal space containing as much as 14% of the data have no serious effect on a 3-D reconstruction (Glaeser et al., Ultramicroscopy (1989) 27:307–318), and because the ambiguous projections were widely distributed in angular space rather than concentrated in a continuous missing cone (data not shown), the existence of these ambiguous projections should not significantly limit the outcome of our procedure. There was, however, a population of random configurations that produced much higher percentages (as many as 100%) of ambiguous projections. These configurations happened to be nearly coplanar or to exhibit symmetry relationships among the clusters, the worst case being full tetrahedral symmetry. In practice, many scFv-heavy atom cluster conjugates will be identified for labeling the particle of interest, and if a particular set of four produces a high percentage of ambiguous projections, other conjugates could be used. With this possibility in mind, we modified the simulations to discard the approximately one-third most ambiguous configurations.

Figure 5:
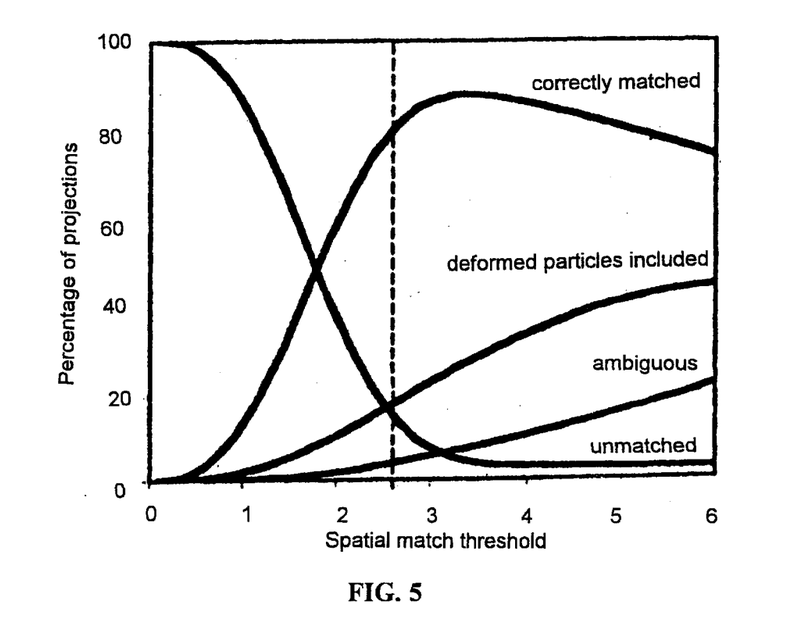
FIG. 5 provides a graphical view of the influence of the spatial match threshold.

The purpose of the second simulation was to explore how the value of the spatial match threshold influenced the selection and alignment of particles. A moderate amount of noise, up to 3.5 Å in a random direction (for a total range of the radius of a Nanogold particle), was added to the rotated cluster coordinates before projection to represent the sum of noise in the position of the heavy atom cluster with respect to the particle and noise in imaging and locating the center of the cluster. For each of 300 randomly generated cluster configurations, 300 particles were rotated randomly and aligned using spatial match thresholds from 0.5 Å to 6.5 Å (FIG. 5). In addition, for each of 300 randomly generated cluster configurations, 300 particles were deformed by randomly displacing one cluster, selected at random, by 14 Å before projection. This deformation models a rotation of one domain of a 500 kDa protein (expected radius 52 Å) about the center of mass by 10°. Such a movement is fortuitously amplified by the length of the scFv, which will likely place the heavy atom cluster about another 28 Å away from the protein surface, so that the total radial arm is 80 Å. The resulting projections were matched against the original, undeformed cluster configurations using the same range of spatial match thresholds.

The results showed that the spatial match threshold set a balance between the efficiency of particle alignment and the selective power of the method. This can be understood by considering a randomly rotated particle to which clusters are flexibly attached. The projected cluster positions in an image are the average cluster positions, as dictated by the rotation angles and the original cluster coordinates, plus a random displacement due to the various sources of noise. To orient the particle, the rotation angles which produce a best-fit projection pattern are found, but some spatial match error due to the noise will remain. If the spatial match threshold is set to a low value, only the least noisy particles are matched to rotation angles and used for averaging. If the spatial match threshold is increased, more and more noisy particles can be aligned, decreasing the total number of particles that have to be imaged and considered. The higher the spatial match threshold, however, the more likely it is that projection patterns from other, closely related or widely different sets of rotation angles will also match the observed pattern, making the particle orientation ambiguous. Moreover, increasing the spatial match threshold makes it more likely that deformed particles will be included, and the selective power of the method is diminished. For 3.5 Å noise, a good choice for the spatial match threshold is 2.7 Å (indicated by the dashed line in FIG. 5), where 83% of particles were aligned correctly, 12% were unmatched, 4% were ambiguous, 1% were mistakenly matched (not shown), and only 18% of deformed particles went undetected.

Figure 7:
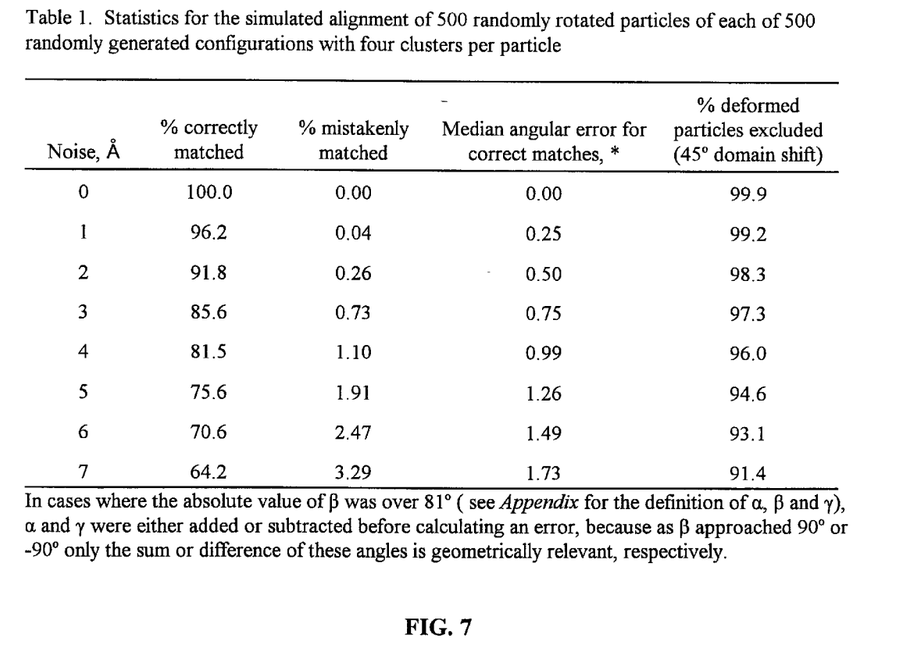
FIG. 7 provides a table of the statistics for the simulated alignment of 500 randomly rotated particles of each of 500 randomly generated configurations with four clusters per particle.

Alignment errors. The third simulation explored how increasing noise in the cluster positions affected the angular alignment error. Five hundred random configurations of four clusters were rotated with 500 random sets of rotation angles each, and varying levels of noise were added to the recorded projection positions before rotation angles were found. The median angular error between the actual angles used to rotate the particle and the angles found by the alignment procedure was calculated (Table 1, column 4). Optimal spatial match thresholds were chosen empirically. The results of this simulation showed that the median angular error for correct matches varied from 0° to 1.7° as noise increased from 0 Å to a full diameter of a Nanogold particle (+/−7 Å). The expected angular error for noise of +/−7 Å, based on the inverse sine of the average cluster displacement due to noise (3.5 Å) divided by the average radial distance from the origin to the cluster (80 Å) as described above, is 2.5°. Thus the presence of four clusters, allowing best-fit angles to be found, significantly reduced the alignment errors. To relate the angular errors to the resolution attainable in a reconstruction, we note that for a 500 kDa protein of expected radius 52 Å, a 1.54 Å carbon-carbon bond at the surface subtends an angle of 1.7°. Thus even at high levels of noise, single particle alignment with heavy atom clusters should allow particle orientation adequate for atomic resolution reconstructions.

Selection. The final simulation was designed to explore the usefulness of the proposed method in selecting a homogeneous population of single particles for averaging. Inhomogeneity can arise from a number of sources, including stoichiometry, conformational state, mechanical deformation, and so forth. Binding of scFv—cluster conjugates to particles would clearly be useful in establishing stoichiometry, as epitopes could be chosen to identify components known to occur at low occupancy. To investigate effects of conformational shift or deformation, a simulation was performed as described above except that the coordinates of one cluster, selected at random, were displaced randomly by 61 Å before projection, which corresponds to a 45° movement of an 80 Å radial arm. With a level of noise (3 Å) near half the diameter of a Nanogold particle, over 97% of the deformed particles were excluded (failed to match).

II. Determination of Three-Dimensional Structure

The three dimensional structure of a macromolecule, e.g. a protein, is determined according to the subject invention as follows:

A. Procedure for Three-dimensional Reconstruction of Macromolecular Structure by Electron Microscopy of Individual Particles With Attached Heavy-atom Clusters 1. Heavy atom cluster label preparation. First a library of antibody fragments, for instance a phage-display library, engineered in the constant, framework regions by the alteration of amino acid residues and perhaps by the addition of prosthetic chemical groups to rigidly bind heavy-atom clusters is constructed. A set of four or more antibody fragments which simultaneously bind the macromolecule is then selected from the library. If the library is stored as a phage-display library in solution, one can select out of the library the desired species by immobilizing the macromolecule on the surface of a container into which the library is poured. After incubation, the library is poured out of the container, the container is washed, and those members of the library which remain bound to the macromolecule on the container walls can be eluted and propagated. The heavy-atom clusters are then bound to the selected antibody fragments. Binding may be done by mixing the two components in solution in buffer conditions that favor binding.

2. Preparation of heavy atom cluster labeled macromolecules. The antibody fragment:heavy-atom cluster complexes are then bound to the macromolecule within an adequately thin, immobilized support layer suitable for high-resolution electron microscopy. One methodology to accomplish this step is to mix a solution of the antibody fragment:heavy-atom cluster complexes with a solution of the macromolecule. Once binding has occurred, very thin layers of such a mixed solution can be formed by depositing the solution on an electron microscope grid, blotting it until it is nearly dry and the solution is thin, and then fast-freezing the grid and solution in liquid ethane. Another methodology to accomplish this step is to add the antibody fragment:heavy-atom cluster complexes to the macromolecule within some media, perhaps even the natural environment of the macromolecule within living tissues, and then fix the media, for instance by exchanging water for a fixative or by freezing. Once the media is made solid, it can be cut into very thin slices and supported on an electron microscope grid.

3. Determination of three-dimensional coordinates. Determine the three-dimensional positions of the heavy-atom clusters on the macromolecule by recording high-resolution transmission electron microscope images of many individual particles, each of which consists of the macromolecule with four or more rigidly attached heavy-atom clusters. One strategy to accomplish this is to record multiple images of the same particles from different perspectives. Image a field of particles without tilting the specimen with respect to the electron beam, and then-image the same field of particle after tilting the goniometer of the microscope. Use these images and the algorithm shown in FIG. 2 and entitled "An algorithm to determine the three-dimensional positions of heavy-atom clusters attached to particles from two, tilted, projection images," to determine the heavy-atom cluster positions.

4. Image recordation. Record images of many individual particles (perhaps hundreds of thousands). In the most likely situation, many such particle images will be contained in random locations within each picture stored by the microscope, for instance as a film micrograph or as a CCD frame capture.

5. Selection. Locate the positions of the heavy-atom cluster images within each picture. This can be done by cross-correlation of the picture with the image of a single heavy-atom cluster, derived either empirically or theoretically. Select only heavy-atom cluster images which appear free of distortions such as drift, astigmatism, inappropriate defocus, etc. Identify and extract suitable images of the macromolecule based on the presence of the expected number of heavy-atom clusters close enough together to be attached to the same particle, but far enough away from any other heavy-atom clusters as to be unambiguously assigned to a unique particle.

6. Alignment. Determine the center of each particle and the three rotation angles characterizing the view from which each particle was imaged using the algorithm depicted in FIG. 3 and entitled "An algorithm to determine the location and orientation of particle images based on the projected positions of four or more, rigidly attached heavy-atom clusters." This calculation also allows inhomogenous particles to be identified and discarded from the growing set.

7. Image Correction. Determine the height of each particle with respect to the objective lens of the microscope (the defocus value). Compensate for the correctable artifacts in the particle images which arise from imperfections in the microscope optics, the recording media, or other sources, such as the effects of beam tilt, magnification variation, and the oscillations of the contrast transfer function.

8. Three-dimensional image reconstruction. Perform a three-dimensional reconstruction of the structure of the particle from the recorded, selected, aligned, and corrected images.

Conclusion

It is evident from the above results and discussion that improved methods of single particle cryoelectron microscopy based three-dimensional structure determination are provided. The subject method preserves the advantages of cryoelectron microscopy and single particle analysis, and overcomes limitations on resolution. The advantages of the subject method include the requirement for very little material, no need for crystalline or otherwise ordered arrays, the possibility of analyzing very large and even partially heterogeneous or disordered objects, and structure determination in the native state. Rigidly fixed having atom clusters allow particle images to be found, selected, aligned and corrected much more quickly and accurately. This permits more particle images to be acquired and included correctly, leading to higher resolution 3-D reconstructions. The selection and alignment strategy used in the above simulations accomplished both tasks at over 200 particles per second (on a 533 MHz, quad-issue DEC alpha running OSF), and required minimal memory. Furthermore, binding scFvs to a particle, as is done is certain embodiments of the subject invention, assists in obtaining the full range of views required for 3-D reconstruction.

In sum, the subject methods are applicable to single molecules and avoid reliance on molecular details for averaging, allowing alignment of images recorded very close to focus, which represents a significant advance over prior art methods. The subject methods also overcome technical limitations of precise determination of alignment parameters, detection of drift, particle inhomogeneity, determination of defocus and magnification variation. Furthermore, the subject methods allow manipulation of particle orientations and the analysis of orders of magnitude more particles because of greater computational speed and the structure determination of even comparatively small proteins to quite high resolution. As such, the subject invention represents a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method of determining the three-dimensional structure of a particle, said method comprising:

(a) obtaining a plurality of labeled particle images, wherein each particle image of said plurality is obtained by:

(i) rigidly attaching at least four heavy atom clusters to said particle so that translational movement of each rigidly attached cluster does not exceed about 4 Å; and (ii) imaging said particle to obtain a labeled particle image; and (b) deriving the three-dimensional structure of said particle from said plurality of particle images, wherein said deriving comprises aligning each of said labeled particle images by deriving the orientation of each of said labeled particle images from the three-dimensional coordinates of said at least four rigidly attached clusters and the cluster projections in each of said labeled particle images to determine the three-dimensional structure of said particle.

2. The method according to claim 1, wherein said heavy atom clusters are directly attached to said particle.

3. The method according to claim 1, wherein said heavy atom clusters are indirectly attached to said particle through a linking group.

4. The method according to claim 1, wherein said images are obtained with an electron microscope.

5. A method for determining the three-dimensional structure of a protein, said method comprising:

(a) obtaining a plurality of images of said protein by:

(i) rigidly attaching at least four heavy atom clusters to said protein so that translational movement of each rigidly attached cluster does not exceed about 4 Å; and (ii) imaging said labeled protein with an electron microscope; and (b) deriving the three-dimensional structure of said protein from said plurality of images by:

(i) aligning each of said plurality of images by deriving the orientation of each of said labeled particle images from the three-dimensional coordinates of said at least four rigidly attached clusters and the cluster projections in each of said images; and (ii) reconstructing the three-dimensional structure from said aligned images to determine the three-dimensional structure of said protein.

6. The method according to claim 5, wherein said heavy atom clusters are attached directly to said protein.

7. The method according to claim wherein said heavy atom clusters are attached indirectly to said protein.

8. The method according to claim 7, wherein said heavy atom clusters are attached to said protein through a linker molecule.

9. The method according to claim 8, wherein said linker molecule is a single chain Fv (scFv).

10. The method according to claim 5, wherein said method further comprises generating said heavy atom cluster labels.

11. A method for determining the three-dimensional structure of a protein, said method comprising:

(a) obtaining a plurality of images of said protein by:

(i) rigidly attaching at least four heavy atom clusters to said protein, wherein said heavy atom clusters are rigidly attached to said protein by a single chain Fv (scFv) linker so that translational movement of each rigidly attached cluster does not exceed about 4 Å; and (ii) taking an image of said labeled protein with an electron microscope; and (b) deriving the three-dimensional structure of said protein from said plurality of images by:

(i) aligning each of said plurality of images by deriving the orientation of said labeled particle image from the three-dimensional coordinates of said at least four rigidly attached clusters and the cluster projections in said image; and (ii) reconstructing the three-dimensional structure from said aligned images to determine the three-dimensional structure of said protein.

\* \* \* \* \*

UNITED STATES PATENT AND TRADEMARK OFFICE
CERTIFICATE OF CORRECTION

PATENT NO. : 6,604,052 B1 Page 1 of 1
DATED : August 5, 2003
INVENTOR(S) : Jensen, Grant Jay et al.

It is certified that error appears in the above-identified patent and that said Letters Patent is hereby corrected as shown below:

Column 18,
Line 51, after the word "claim" please add -- 5 --.

Signed and Sealed this

Fourteenth Day of October, 2003

JAMES E. ROGAN
*Director of the United States Patent and Trademark Office*